United States Patent
Murata et al.

(10) Patent No.: US 12,252,625 B2
(45) Date of Patent: Mar. 18, 2025

(54) COATING COMPOSITION

(71) Applicant: KANSAI PAINT CO., LTD., Hyogo (JP)

(72) Inventors: Hiroshi Murata, Aichi (JP); Toru Uozumi, Aichi (JP); Masahiro Omura, Aichi (JP)

(73) Assignee: KANSAI PAINT CO., LTD., Hyogo (JP)

(*) Notice: Subject to any disclaimer, the term of this patent is extended or adjusted under 35 U.S.C. 154(b) by 0 days.

(21) Appl. No.: 17/299,025

(22) PCT Filed: Sep. 13, 2019

(86) PCT No.: PCT/JP2019/036208
§ 371 (c)(1),
(2) Date: Jun. 2, 2021

(87) PCT Pub. No.: WO2020/115984
PCT Pub. Date: Jun. 11, 2020

(65) Prior Publication Data
US 2022/0033677 A1    Feb. 3, 2022

(30) Foreign Application Priority Data
Dec. 7, 2018  (JP) .................. 2018-230226

(51) Int. Cl.
| C09D 175/14 | (2006.01) |
| B05D 7/00 | (2006.01) |
| C09D 7/20 | (2018.01) |
| C09D 7/42 | (2018.01) |
| C09D 7/61 | (2018.01) |

(52) U.S. Cl.
CPC ........... *C09D 175/14* (2013.01); *B05D 7/532* (2013.01); *B05D 7/577* (2013.01); *C09D 7/20* (2018.01); *C09D 7/42* (2018.01); *C09D 7/61* (2018.01)

(58) Field of Classification Search
CPC ...... C09D 175/14; C09D 175/04; C09D 5/00; C09D 7/20; C09D 7/42; C09D 7/62; C08K 3/36; C08K 9/04; C08G 18/0852; C08G 18/6229; C08G 18/792; C08F 212/08; C08F 220/06; C08F 220/1808; C08F 220/1811; C08F 220/20; B05D 1/04; B05D 2202/10; B05D 2401/10; B05D 2503/00; B05D 2601/04; B05D 2601/08; B05D 2601/10; B05D 2601/22; B05D 5/02; B05D 7/532; B05D 7/572; B05D 7/577
USPC ....................................... 106/236
See application file for complete search history.

(56) References Cited

U.S. PATENT DOCUMENTS

| 2012/0045585 A1 | 2/2012 | Tsukamoto et al. |
| 2012/0107618 A1 | 5/2012 | Gidcumb et al. |
| 2018/0185877 A1* | 7/2018 | Ochi .................... C09D 167/02 |

FOREIGN PATENT DOCUMENTS

| JP | 2009263631 A | * 11/2009 | ......... C09D 133/066 |
| JP | 2010-082529 A | 4/2010 | |
| JP | 2010-253378 A | 11/2010 | |
| JP | 2012-097260 A | 5/2012 | |
| JP | 2014-065903 A | 4/2014 | |
| JP | 2014177598 A | 9/2014 | |
| JP | 2017-082035 A | 5/2017 | |
| JP | 2018-002900 A | 1/2018 | |
| WO | 2016/017778 A1 | 2/2016 | |

OTHER PUBLICATIONS

Machine translation of JP 2010082529 A originally published Apr. 2010 to Kubota et al. (Year: 2010).*
Machine translation of WO 2016017778 A1 originally published Feb. 2016 to Azuma et al. (Year: 2016).*
Ataman Chemicals: ACEMATTOK412 [online], [retrieved on Dec. 16, 2022]. Retrieved from the internet: < URL: https://www.atamanchemicals.com/acematt-ok-412_u25086/> (Year: 2022).*
Machine translation of JP 2009263631 A originally published Nov. 2009 to Ono et al. (Year: 2009).*
Makevale: Clear casting resin [online], [retrieved on Aug. 21, 2023]. Retrieved from the internet: < URL: https://www.makevale.com/applications/clear-casting-resin/.> (Year: 2023).*
International Search Report dated Nov. 26, 2019 issued in corresponding PCT/JP2019/036208 application (2 pages).

* cited by examiner

*Primary Examiner* — Coris Fung
*Assistant Examiner* — Ritu S Shirali
(74) *Attorney, Agent, or Firm* — Millen White Zelano & Branigan; Csaba Henter

(57) ABSTRACT

A coating composition having excellent trickle resistance which forms a coating film that exhibits excellent gloss stability. The coating composition contains a hydroxyl group-containing acrylic resin (A), a polyisocyanate compound (B), a matting agent (C), an organic solvent (D1) and an organic solvent (D2), and wherein the organic solvent (D1) has a specified boiling point and solubility parameter; the organic solvent (D2) has a specified boiling point and solubility parameter; and with respect to the contents of the organic solvent (D1) and the organic solvent (D2) based on 100 parts by mass of the total solid content of the hydroxyl group-containing acrylic resin (A) and the polyisocyanate compound (B), the content of the organic solvent (D1) is within the range of 5-40 parts by mass and the content of the organic solvent (D2) is within the range of 35-75 parts by mass.

18 Claims, No Drawings

COATING COMPOSITION

FIELD

The present invention relates to a coating composition.

BACKGROUND

Outer plating coating films on bodies for automobiles and the like have conventionally had glossy design features, but in recent years there has been increasing interest in "matte designs" as a new type of design with reduced gloss.

An example of a method of forming a coating film exhibiting a matte design (hereunder also referred to as "matte coating film") is described in PTL 1, for example, as a low-gloss two-component clear coat that comprises a base resin including a urethane resin, an isocyanate resin that is combined with the base resin just before application of the low-gloss two-component clear coat, to form a two-component base resin mixture, and a silica-based delustering agent.

PTL 2 states that it is possible to obtain a coating composition with excellent gloss stability by using a coating composition comprising a film-forming resin (A) and a matting agent (B), and also a nonaqueous polymer dispersion (C) composed of a skin component and a core component, and/or a blocked polyisocyanate compound (D), wherein the nonaqueous polymer dispersion (C) is a nonaqueous polymer dispersion comprising an acrylic polymer and/or a macromonomer comprising a self-condensate of a fatty acid having a hydroxyalkyl group in which the alkyl chain has 10 to 25 carbon atoms, and also comprising at least one polymerizable unsaturated group per molecule on average, as at least part of the skin component, and the blocked polyisocyanate compound (D) is an active methylene-based blocked polyisocyanate compound of which the compound dissociating in crosslinking reaction is a monofunctional alcohol of 3 to 12 carbon atoms.

CITATION LIST

Patent Literature

[PTL 1] Japanese Unexamined Patent Publication No. 2012-97260
[PTL 2] WO2016/017778

SUMMARY

Technical Problem

While it is possible to form a matte coating film with the coating composition of PTL 1, it has often been the case that the gloss of the formed coating film varies considerably when the coated film thickness or coating environment has varied. In other words, the gloss stability has sometimes been inadequate.

The coating composition of PTL 2 has excellent gloss stability but has often been inadequate in terms of anti-sagging properties during application. It is also desired for the composition to exhibit even more excellent gloss stability.

It is therefore an object of the present invention to provide a coating composition with excellent gloss stability of the formed coating film, while also having excellent anti-sagging properties.

Solution to Problem

The present inventors have avidly conducted research with the object of solving the problems described above. As a result it has been found that excellent coating film gloss stability and excellent anti-sagging properties are exhibited by a coating composition comprising a hydroxyl group-containing acrylic resin (A), a polyisocyanate compound (B), a matting agent (C) and also specific organic solvents (D1) and (D2), wherein the contents of the organic solvents (D1) and (D2) are within specified ranges, and the present invention has been completed based on this finding.

According to the invention it is possible to provide a coating composition and a method for forming a multilayer coating film, encompassing the following.

1. A coating composition comprising a hydroxyl group-containing acrylic resin (A), a polyisocyanate compound (B), a matting agent (C), an organic solvent (D1) and an organic solvent (D2), wherein:
   the organic solvent (D1) is an organic solvent with a boiling point in the range of 190 to 250° C. and a solubility parameter of 9 to 11,
   the organic solvent (D2) is an organic solvent with a boiling point in the range of 100 to 140° C. and a solubility parameter of 8 or greater and less than 9, and
   the content of the organic solvent (D1) is in the range of 5 to 40 parts by mass and the content of the organic solvent (D2) is in the range of 35 to 75 parts by mass, based on 100 parts by mass as the total solid content of the hydroxyl group-containing acrylic resin (A) and polyisocyanate compound (B).
2. The coating composition according to 1. above, wherein the matting agent (C) is silica particles (C1).
3. The coating composition according to 2. above, wherein the silica particles (C1) are organically treated silica particles (C1').
4. The coating composition according to any one of 1. to 3. above, wherein the total content of the organic solvent (D1) and organic solvent (D2) is in the range of 60 to 100 parts by mass based on 100 parts by mass as the total solid content of the hydroxyl group-containing acrylic resin (A) and polyisocyanate compound (B).
5. A method for forming a multilayer coating film comprising:
   (1) a step of applying a base coat material composition (BC) onto an article to be coated to form an uncured base coat coating film,
   (2) a step of applying a clear coating material composition (CC) onto the uncured base coat coating film to form an uncured clear coating film, and
   (3) a step of heating the uncured base coat coating film and uncured clear coating film to simultaneously cure both coating films,
   wherein the clear coating material composition (CC) is a coating composition according to any one of 1. to 4. above.
6. A method for forming a multilayer coating film comprising:
   (1) a step of applying a base coat material composition (BC) onto an article to be coated to form an uncured base coat coating film,
   (2) a step of applying a first clear coating material composition (CC1) onto the uncured base coat coating film to form an uncured first clear coating film,
   (3) a step of heating the uncured base coat coating film and uncured first clear coating film to simultaneously cure both coating films,
   (4) a step of applying a second clear coating material composition (CC2) onto the cured first clear coating film to form an uncured second clear coating film, and (5) a step of heating the uncured second clear coating film to cure it, wherein the second clear coating material composition (CC2) is a coating composition according to any one of 1. to 4. above.

Advantageous Effects of Invention

The coating composition of the invention has excellent anti-sagging properties and can form a coating film with excellent gloss stability.

DESCRIPTION OF EMBODIMENTS

The coating composition and method for forming a multilayer coating film of the invention will now be explained in greater detail.

The coating composition of the invention (hereunder also abbreviated as "the present coating material") is a coating composition comprising a hydroxyl group-containing acrylic resin (A), a polyisocyanate compound (B), a matting agent (C) and specified organic solvents (D1) and (D2), wherein the contents of the organic solvents (D1) and (D2) are within specified ranges.

Hydroxyl Group-Containing Acrylic Resin (A)

The hydroxyl group-containing acrylic resin (A) can be produced by copolymerizing a hydroxyl group-containing polymerizable unsaturated monomer (a1) and another polymerizable unsaturated monomer (a2) by a publicly known method.

The hydroxyl group-containing polymerizable unsaturated monomer (a1) is a compound having one or more hydroxyl groups and polymerizable unsaturated groups in the molecule. Specifically preferred for the hydroxyl group-containing polymerizable unsaturated monomer (a1) are monoesters of acrylic acid or methacrylic acid with dihydric alcohols of 2 to 10 carbon atoms, examples of which include hydroxyalkyl (meth)acrylates such as 2-hydroxyethyl (meth)acrylate, 2-hydroxypropyl (meth)acrylate, 3-hydroxypropyl (meth)acrylate and 4-hydroxybutyl (meth)acrylate. As the hydroxyl group-containing polymerizable unsaturated monomer (a-1) there may also be mentioned ring-opening polymerization addition products of the aforementioned hydroxyalkyl (meth)acrylates with lactone compounds such as ε-caprolactone. Specific examples of ring-opening polymerization addition products include "PLACCEL FA-1", "PLACCEL FA-2", "PLACCEL FA-3", "PLACCEL FA-4", "PLACCEL FA-5", "PLACCEL FM-1", "PLACCEL FM-2", "PLACCEL FM-3", "PLACCEL FM-4" and "PLACCEL FM-5" (all trade names of Daicel Chemical Industries, Ltd.). These hydroxyl group-containing polymerizable unsaturated monomers (a1) may be used alone or in combinations of two or more.

Throughout the present specification, "(meth)acrylate" means "acrylate or methacrylate". The term "(meth)acrylic acid" means "acrylic acid or methacrylic acid". The term "(meth)acrylamide" means "acrylamide or methacrylamide".

The other polymerizable unsaturated monomer (a2) may be any of the following monomers (a2-1) to (a2-8).

(a2-1) Acid Group-Containing Polymerizable Unsaturated Monomers:

Compounds having at least one acid group and one polymerizable unsaturated group in the molecule, examples of which include carboxyl group-containing polymerizable unsaturated monomers such as (meth)acrylic acid, crotonic acid, itaconic acid, maleic acid and maleic anhydride; sulfonic acid group-containing polymerizable unsaturated monomers such as vinylsulfonic acid and sulfoethyl (meth)acrylate; and acidic phosphoric acid ester-based polymerizable unsaturated monomers such as 2-(meth)acryloyloxyethyl acid phosphate, 2-(meth)acryloyloxypropyl acid phosphate, 2-(meth)acryloyloxy-3-chloropropyl acid phosphate and 2-methacroyloxyethylphenylphosphoric acid.

(a2-2) Monoesters of (Meth)Acrylic Acids and Monohydric Alcohols of 1 to 20 Carbon Atoms:

Examples include methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, isooctyl (meth)acrylate, isomyristyl (meth)acrylate, "Isostearyl acrylate" (trade name of Osaka Organic Chemical Industry, Ltd.), lauryl (meth)acrylate, tridecyl (meth)acrylate and stearyl (meth)acrylate.

(a2-3) Polymerizable Unsaturated Monomers with Alicyclic Hydrocarbon Groups:

These include cyclohexyl (meth)acrylate, isobornyl (meth)acrylate, tricyclodecanyl (meth)acrylate, adamantyl (meth)acrylate, 3,5-dimethyladamantyl (meth)acrylate, 3-tetracyclododecyl methacrylate, 4-methylcyclohexylmethyl (meth)acrylate, 4-ethylcyclohexylmethyl (meth)acrylate, 4-methoxycyclohexylmethyl (meth)acrylate, tert-butylcyclohexyl (meth)acrylate, cyclooctyl (meth)acrylate, cyclododecyl (meth)acrylate and tetrahydrofurfuryl (meth)acrylate. Cyclohexyl (meth)acrylate and isobornyl (meth)acrylate are preferred from the viewpoint of acid resistance and stain resistance.

Polymerizable unsaturated monomers having both alicyclic hydrocarbon and hydroxyl groups are included in the hydroxyl group-containing polymerizable unsaturated monomer (a-1).

(a2-4) Aromatic Polymerizable Unsaturated Monomers:

Examples include styrene, α-methylstyrene and vinyltoluene.

(a2-5) Glycidyl Group-Containing Polymerizable Unsaturated Monomers:

Compounds having one glycidyl group and one polymerizable unsaturated group in the molecule, specific examples including glycidyl acrylate and glycidyl methacrylate.

(a2-6) Nitrogen-Containing Polymerizable Unsaturated Monomers:

Examples include (meth)acrylamide, dimethyl acrylamide, N,N-dimethylpropyl acrylamide, N-butoxymethyl acrylamide, N-methylolacrylamide, N-methylolmethacrylamide, diacetoneacrylamide, N,N-dimethylaminoethyl (meth)acrylate, vinylpyridine and vinylimidazole.

(a2-7) Other Vinyl Compounds:

Examples include vinyl acetate, vinyl propionate, vinyl chloride and the vinyl versatate esters "VeoVa 9" and "VeoVa 10" (trade names of Hexion Co.).

(a2-8) Polymerizable Unsaturated Group-Containing Nitrile-Based Compounds:

Examples include acrylonitrile and methacrylonitrile.

The other polymerizable unsaturated monomers that are copolymerizable may be used alone or in combinations of two or more.

The amount of the hydroxyl group-containing polymerizable unsaturated monomer (a-1) used is preferably 15 to 50 parts by mass, more preferably 20 to 45 parts by mass and even more preferably 25 to 40 parts by mass, with 100 parts by mass being the amount of polymerizable unsaturated monomer used for production of the hydroxyl group-containing acrylic resin.

If the amount of hydroxyl group-containing polymerizable unsaturated monomer (a-1) used is 15 parts by mass or greater, then crosslinking in the cured coating film will help the desired alkali resistance to be more easily obtained. If it is 50 parts by mass or lower, on the other hand, the compatibility and/or copolymerization reactivity with the other polymerizable unsaturated monomer (a2) will be improved, and the improved compatibility with the other components in the coating material will enhance the finished outer appearance of the coating film.

From the viewpoint of the weather resistance and alkali resistance of the coating film that is formed, it is preferred to use an acid group-containing polymerizable unsaturated monomer (a2-1) for at least one other polymerizable unsaturated monomer (a2).

The amount of the acid group-containing polymerizable unsaturated monomer (a2-1) used is preferably 0.05 to 5 parts by mass, more preferably 0.1 to 3 parts by mass and even more preferably 0.5 to 2 parts by mass, with 100 parts by mass being the amount of polymerizable unsaturated monomer used for production of the hydroxyl group-containing acrylic resin.

From the viewpoint of alkali resistance and outer appearance of the coating film that is to be formed, it is preferred to use a polymerizable unsaturated monomer (a2-3) having an alicyclic hydrocarbon group, as at least one type of the other polymerizable unsaturated monomer (a2).

The amount of the alicyclic hydrocarbon group-containing polymerizable unsaturated monomer (a2-3) used is preferably 1 to 40 parts by mass, more preferably 10 to 40 parts by mass and even more preferably 20 to 40 parts by mass, with 100 parts by mass being the amount of polymerizable unsaturated monomer used for production of the hydroxyl group-containing acrylic resin.

From the viewpoint of the weather resistance and alkali resistance of the coating film that is formed, it is preferred to use an aromatic polymerizable unsaturated monomer (a2-4) for at least one other polymerizable unsaturated monomer (a2).

The amount of the aromatic polymerizable unsaturated monomer (a2-4) used is preferably 5 to 50 parts by mass, more preferably 5 to 40 parts by mass and even more preferably 5 to 30 parts by mass, with 100 parts by mass being the amount of polymerizable unsaturated monomer used for production of the hydroxyl group-containing acrylic resin.

The method of copolymerizing the aforementioned polymerizable unsaturated monomer to obtain the hydroxyl group-containing acrylic resin is not particularly restricted and any known copolymerization method may be used, but most preferred is a solution polymerization method wherein polymerization is conducted in an organic solvent in the presence of a polymerization initiator.

Examples of organic solvents to be used in the solution polymerization method include aromatic solvents such as toluene, xylene and "SWASOL 1000" (high boiling point petroleum-based solvent, trade name of Cosmo Oil Co., Ltd.); ester-based solvents such as ethyl acetate, 3-methoxybutyl acetate, ethylene glycol ethyl ether acetate, propylene glycol methyl ether acetate, propyl propionate, butyl propionate and ethoxyethyl propionate; and ketone-based solvents such as methyl ethyl ketone, methyl isobutyl ketone and methyl amyl ketone.

Any one of these organic solvents may be used, or two or more may be used in combination. Using a high-boiling-point ester-based solvent or ketone-based solvent is preferred from the viewpoint of solubility of the hydroxyl group-containing acrylic resin to be used in the coating composition of the invention. In addition to these organic solvents, high boiling point aromatic solvents may also be used in appropriate combinations.

Examples of polymerization initiators that may be used for copolymerization of hydroxyl group-containing acrylic resins include known radical polymerization initiators such as 2,2'-azobisisobutyronitrile, benzoyl peroxide, di-t-butyl peroxide, di-t-amyl peroxide, t-butyl peroctoate and 2,2'-azobis(2-methylbutyronitrile).

The hydroxyl value of the hydroxyl group-containing acrylic resin is preferably in the range of 80 to 200 mgKOH/g and more preferably in the range of 100 to 170 mgKOH/g. If the hydroxyl value is 80 mgKOH/g or greater, the crosslink density will be high, making it easier to obtain the desired weather resistance, alkali resistance and coating film appearance. It is also preferably 200 mgKOH/g or lower since the water resistance of the coating film will be improved.

The weight-average molecular weight of the hydroxyl group-containing acrylic resin is preferably in the range of 2500 to 40,000 and more preferably in the range of 4000 to 30,000. The weight-average molecular weight is preferably 2500 or greater since this will make it easier to obtain the desired film performance such as weather resistance, alkali resistance and coating film appearance. The weight-average molecular weight is preferably 40,000 or lower, since the smoothness of the coating film will improve and the finished appearance will be enhanced.

The weight-average molecular weight, for the purpose of the present specification, is the value of the weight-average molecular weight measured with a gel permeation chromatograph ("HLC8120GPC" by Tosoh Corp.), converted based on the weight-average molecular weight of polystyrene. Four columns were used, namely "TSKgel G-4000HXL", "TSKgel G-3000HXL", "TSKgel G-2500HXL" and "TSKgel G-2000HXL" (all trade names of Tosoh Corp.), with the following conditions: mobile phase: tetrahydrofuran, measuring temperature: 40° C., flow rate: 1 mL/min, detector: RI. The number-average molecular weight is likewise the value measured under the same conditions described above.

The glass transition temperature of the hydroxyl group-containing acrylic resin is usually preferred to be in the range of −40° C. to 85° C., and is most preferably in the range of −30° C. to 80° C. A glass transition temperature of −40° C. or higher will allow the desired coated film hardness to be obtained, while at 85° C. or lower the coating surface smoothness of the coating film will be advantageously improved.

The hydroxyl group-containing acrylic resin may be used as a single type alone, or two or more may be used in combination.

Polyisocyanate Compound (B)

The polyisocyanate compound (B) is a compound with at least two isocyanate groups in the molecule, and examples include aliphatic polyisocyanates, alicyclic polyisocyanates, araliphatic polyisocyanates, aromatic polyisocyanates, and derivatives of these polyisocyanates.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylenebis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-dnisocyanatomethyl)-bicyclo(2.2.1)heptane, 2-(3-isocyanatopropyl)-2,6-dnisocyanatomethyl)-bicyclo(2.2.1)heptane, 3-(3-isocyanatopropyl)-2,5-dnisocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of araliphatic polyisocyanates include araliphatic diisocyanates such as methylene bis(4,1-phenylene) diisocyanate (common name: MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and araliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates such as triphenylmethane-4,4',4"-triisocyanate, 1,3,5-triisocyanatobenzene and 2,4,6-triisocyanatotoluene; and aromatic tetraisocyanates such as 4,4'-diphenylmethane-2,2',5,5'-tetraisocyanate.

Examples of the aforementioned polyisocyanate derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

These polyisocyanates and their derivatives may be used alone or in combinations of two or more. Among these polyisocyanate compounds, aliphatic diisocyanates and their derivatives are most preferred from the standpoint of weather resistance.

The polyisocyanate compound (B) used may also be a prepolymer obtained by reacting the polyisocyanate or its derivative with a compound having an active hydrogen group such as a hydroxyl or amino group that can react with the polyisocyanate, under conditions with an excess of isocyanate groups. Examples of compounds that can react with the polyisocyanate include polyhydric alcohols, low molecular weight polyester resins, amines and water.

The polyisocyanate compound (B) may be used as a single type alone or as a combination of two or more types.

Matting Agent (C)

The matting agent (C) used may be a known matting agent that is conventionally used in a coating material. Examples of types of matting agents include inorganic fine particles and resin beads.

The content of the matting agent (C) is preferably in the range of 5 to 50 parts by mass, more preferably in the range of 10 to 50 parts by mass and even more preferably in the range of 10 to 40 parts by mass, based on 100 parts by mass as the total solid content of the hydroxyl group-containing acrylic resin (A) and the polyisocyanate compound (B).

Examples of inorganic fine particles include silica particles (C1), alumina particles, titania particles, zirconia particles, zircon particles, tin oxide particles and magnesia particles, as well as mixtures of the foregoing. Silica particles (C1) are particularly preferred as inorganic fine particles from the viewpoint of matte performance and storage stability. The form of the silica particles (C1) is not particularly restricted, and spherical, hollow, porous, rod-shaped, lamellar, filamentous or amorphous forms may be used.

Examples of commercial products to be used as the silica particles (C1) include the SYLYSIA Series ("SYLYSIA 350", "SYLYSIA 430", "SYLYSIA 435", "SYLYSIA 436" and "SYLYSIA 450), the SYLOPHOBIC Series ("SYLOPHOBIC 100", "SYLOPHOBIC 200", "SYLOPHOBIC 702" and "SYLOPHOBIC 4004") and the SYLOSPHERE Series ("SYLOSPHERE 1504" and "SYLOSPHERE 1510") by Fuji Silysia Chemical, Ltd., the SYLOID Series ("SYLOID W300" and "SYLOID W500") by Grace Japan Co., the ACEMATT Series ("ACEMATT HK460", "ACEMATT HK400", "ACEMATT OK412", "ACEMATT TS100", "ACEMATT 3200", "ACEMATT 3300" and "ACEMATT 3600") by Evonik Degussa Japan, the NIPGEL Series ("NIPGEL AZ-200") and the NIPSIL Series ("NIPSIL E-200A", "NIPSIL SS-50B" and "NIPSIL SS-178B") by Nippon Silica Industries Co., Ltd., the MIZUKASIL Series ("MIZUKASIL P-73" and "MIZUKASIL P-526") by Mizusawa Industrial Chemicals, Ltd., the CARPLEX Series ("CARPLEX CS-8") by Shionogi & Co., Ltd., the AEROSIL Series ("AEROSIL 200", "AEROSIL R805" and "AEROSIL R972") by Nippon Aerosil Co., Ltd., and the RADIOLITE Series ("RADIOLITE 100", "RADIOLITE 200", "RADIOLITE 500", "RADIOLITE 500R" and "RADIOLITE 500RS") by Showa Chemical Industry Co., Ltd.

The inorganic fine particles may be untreated inorganic fine particles or inorganic fine particles that have been surface-treated with an organic compound or inorganic compound. The inorganic fine particles are preferably organically treated from the viewpoint of alkali resistance and gloss stability, and more preferably they are organically treated silica particles (C1'). Treatment with an organic compound may be polyethylene treatment, polyethylene wax treatment or hydrophobic surface treatment.

The content of the inorganic fine particles is preferably in the range of 5 to 25 parts by mass, more preferably in the range of 7 to 20 parts by mass and even more preferably in the range of 9 to 17 parts by mass, based on 100 parts by mass as the total solid content of the hydroxyl group-containing acrylic resin (A) and the polyisocyanate compound (B).

If the inorganic fine particle content is 5 parts by mass or greater it will be possible to form a coating film with reduced gloss. If the inorganic fine particle content is 25 parts by mass or lower it will be possible to form a coating film with excellent alkali resistance.

Examples of resin beads include PMMA (polymethyl methacrylate) resin beads, MMA-EGDM (ethylene glycol dimethacrylate) copolymer resin beads, nylon resin beads and polytetrafluoroethylene resin beads.

Examples of commercial products to be used as the resin beads include the "TECHPOLYMER Series" (trade name) by Sekisui Kasei Co., Ltd., and the "DYNEON Series" (trade name) by Sumitomo 3M.

The content of the resin beads is preferably in the range of 10 to 50 parts by mass, more preferably in the range of 15 to 50 parts by mass and even more preferably in the range of 15 to 40 parts by mass, based on 100 parts by mass as the total solid content of the hydroxyl group-containing acrylic resin (A) and the polyisocyanate compound (B).

If the resin beads content is 10 parts by mass or greater it will be possible to form a coating film with reduced gloss. If the resin beads content is 50 parts by mass or lower it will be possible to form a coating film with excellent smoothness.

From the viewpoint of matte performance and storage stability, the matting agent (C) has a mean particle size of preferably 1 to 20 μm, more preferably 2 to 15 μm and even more preferably 3 to 10 μm.

Throughout the present specification, the "mean particle size" of the matting agent is the D50 value of the particle size distribution measured using a laser scattering method. The D50 value is the particle size at which the cumulative particle size distribution from the small particle size end is 50% in the volume-based particle size distribution. For the purpose of the present specification, the volume-based particle size distribution of the matting agent was measured using a "Microtrac MT3300" laser diffraction/scattering particle size distribution analyzer (trade name of Nikkiso Co., Ltd.). For pretreatment, a mixed solvent comprising acetone and isopropyl alcohol was added to the silica particles and they were dispersed with ultrasonic waves for 1 minute, and the matting agent concentration was adjusted to the prescribed transmittance range set by the device used.

From the viewpoint of matte performance, the oil absorption of the matting agent (C) is preferably 100 to 400 mL/100 g, more preferably 100 to 380 mL/100 g and even more preferably 100 to 360 mL/100 g.

As used herein, the oil absorption of the matting agent is the value measured according to JIS K5101-13-2:2004.

Organic Solvent (D1)

The organic solvent (D1) is an organic solvent with a boiling point in the range of 190° C. to 250° C. and a solubility parameter of 9 to 11.

If the boiling point of the organic solvent (D1) is 190° C. or higher it will be possible to obtain a coating film with excellent gloss stability, and if it is 250° C. or lower it will be possible to obtain a coating material with excellent anti-sagging properties. From the viewpoint of gloss stability and anti-sagging properties, the boiling point of the organic solvent (D1) is in the range of preferably 190° C. to 240° C. and more preferably 190° C. to 230° C.

If the solubility parameter of the organic solvent (D1) is 9 or greater it will be possible to obtain a coating film with excellent gloss stability, and if the solubility parameter is 11 or lower it will be possible to obtain a coating material with excellent compatibility. From the viewpoint of gloss stability and compatibility, the solubility parameter of the organic solvent (D1) is in the range of preferably 9.3 to 10.5 and more preferably 9.5 to 10.

Examples for the organic solvent (D1) include propylene glycol diacetate (boiling point: 190° C., solubility parameter: 9.6), 1,4-butanediol diacetate (boiling point: 232° C., solubility parameter: 9.6), 1,3-butylene glycol diacetate (boiling point: 232° C., solubility parameter: 9.5), diethyleneglycol monoethyl ether acetate (boiling point: 217° C., solubility parameter: 9.0), dipropyleneglycol methyl ether (boiling point: 190° C., solubility parameter: 9.7), diethyleneglycol monoethyl ether (boiling point: 202° C., solubility parameter: 10.9), dipropylene glycol n-propyl ether (boiling point: 212° C., solubility parameter: 9.5), dipropylene glycol n-butyl ether (boiling point: 229° C., solubility parameter: 9.4), tripropylene glycol methyl ether (boiling point: 242° C., solubility parameter: 9.4), diethyleneglycol monobutyl ether (boiling point: 231° C., solubility parameter: 9.8) and "DBE" (mixture of dimethyl glutarate, dimethyl succinate and dimethyl adipate, product of Dow DuPont) (boiling point: 196 to 225° C., solubility parameter: 9.8).

The organic solvent (D1) used may be a single type or a combination of two or more types.

The content of the organic solvent (D1) in the coating composition of the invention is 5 to 40 parts by mass based on 100 parts by mass as the total solid content of the hydroxyl group-containing acrylic resin (A) and polyisocyanate compound (B).

If the content of the organic solvent (D1) is 5 parts by mass or greater based on 100 parts by mass as the total solid content of the hydroxyl group-containing acrylic resin (A) and polyisocyanate compound (B) it will be possible to obtain a coating film with excellent gloss stability, and if it is 40 parts by mass or lower it will be possible to obtain a coating material with excellent anti-sagging properties. From the viewpoint of gloss stability and anti-sagging properties, the content of the organic solvent (D1) is in the range of preferably 10 to 40 parts by mass and more preferably 10 to 35 parts by mass.

Organic Solvent (D2)

The organic solvent (D2) to be used in the coating composition of the invention is an organic solvent having a boiling point in the range of 100° C. to 140° C. and a solubility parameter of 8 or greater and less than 9.

If the boiling point of the organic solvent (D2) is 100° C. or higher it will be possible to obtain a coating film with excellent smoothness, and if it is 140° C. or lower it will be possible to obtain a coating film with excellent gloss stability. From the viewpoint of smoothness and gloss stability, the boiling point of the organic solvent (D2) is in the range of preferably 100° C. to 130° C. and more preferably 110° C. to 130° C.

If the solubility parameter of the organic solvent (D2) is 8 or higher it will be possible to obtain a coating material with excellent compatibility, and if the solubility parameter is lower than 9 it will be possible to obtain a coating film with excellent gloss stability. From the viewpoint of compatibility and gloss stability, the solubility parameter of the organic solvent (D2) is in the range of preferably 8.1 to 8.9 and more preferably 8.3 to 8.8.

Examples for the organic solvent (D2) include propyl acetate (boiling point: 102° C., solubility parameter: 8.7), butyl acetate (boiling point: 126° C., solubility parameter: 8.7), isobutyl acetate (boiling point: 117° C., solubility parameter: 8.4), toluene (boiling point: 111° C., solubility parameter: 8.9), "Mixed xylene" (trade name of Maruzen Petrochemical Co., Ltd., boiling point: 136° C., solubility parameter: 8.9) and methyl isobutyl ketone (boiling point: 116° C., solubility parameter: 8.6).

The organic solvent (D2) used may be a single type or a combination of two or more types.

The content of the organic solvent (D2) is 35 to 75 parts by mass based on 100 parts by mass as the total solid content of the hydroxyl group-containing acrylic resin (A) and polyisocyanate compound (B). If the content of the organic solvent (D2) is 35 parts by mass or greater based on 100 parts by mass as the total solid content of the hydroxyl group-containing acrylic resin (A) and polyisocyanate compound (B) it will be possible to obtain a coating film with excellent anti-sagging properties, and if it is 75 parts by mass or lower it will be possible to obtain a coating film with excellent gloss stability. From the viewpoint of anti-sagging properties and gloss stability, the content of the organic solvent (D2) is in the range of preferably 35 to 70 parts by mass and more preferably 40 to 70 parts by mass.

From the viewpoint of gloss stability and anti-sagging properties of the formed coating film, the total content of the organic solvent (D1) and organic solvent (D2) is in the range of preferably 60 to 100 parts by mass and more preferably 70 to 90 parts by mass, based on 100 parts by mass as the total solid content of the hydroxyl group-containing acrylic resin (A) and polyisocyanate compound (B).

The coating composition of the invention may also comprise an organic solvent other than the organic solvent (D1) and organic solvent (D2).

Examples of organic solvents other than the organic solvent (D1) and organic solvent (D2) include aliphatic hydrocarbon-based solvents such as hexane and heptane; ester-based solvents such as ethyl acetate; ether-based solvents such as propylene glycol-n-propyl ether; alcohol-based solvents such as ethanol, propanol and 2-ethylhexyl alcohol; ketone-based solvents such as methyl ethyl ketone; aromatic hydrocarbon-based solvents such as "SWASOL 310" and "SWASOL 1000" (both by Cosmo Oil Co., Ltd.); alicyclic hydrocarbon-based solvents and amide-based solvents. Any of these organic solvents may be used alone or in combinations of two or more.

From the viewpoint of coating manageability, the content of the organic solvent in the coating composition of the invention is preferably in the range of 100 to 150 parts by mass and more preferably in the range of 110 to 140 parts by mass, based on 100 parts by mass as the total solid content of the hydroxyl group-containing acrylic resin (A) and polyisocyanate compound (B).

Coating Composition

The coating composition of the invention is a coating composition comprising a hydroxyl group-containing acrylic resin (A), a polyisocyanate compound (B), a matting agent (C) and specified organic solvents (D1) and (D2), wherein the contents of the organic solvents (D1) and (D2) are within specified ranges. A coating film obtained by application of the coating composition of the invention has a matte property.

A "matte property", for the purpose of this specification, corresponds to a 60° specular gloss value of less than 75, preferably less than 70 and more preferably less than 65, as measured for the formed coating film based on JIS K 5600-4-7:1999.

If necessary, the coating composition of the invention may further comprise coating material additives commonly used in the field of coating materials, such as resins other than the hydroxyl group-containing acrylic resin (A), curing catalysts, color pigments, brightness pigments, extender pigments, pigment dispersants, leveling agents, ultraviolet absorbers, light stabilizers and plasticizers.

Examples of resins other than the hydroxyl group-containing acrylic resin (A) include acrylic resins without hydroxyl groups, polyester resins optionally with hydroxyl groups, polyether resins optionally with hydroxyl groups, and polyurethane resins optionally with hydroxyl groups. Any of these may be used alone or in combinations of two or more.

Examples of curing catalysts include organometallic compounds such as tin octylate, dibutyltin diacetate, dibutyltin di(2-ethyl hexanoate), dibutyltin dilaurate, dioctyltin diacetate, dioctyltin di(2-ethyl hexanoate), dibutyltin oxide, dibutyltin sulfide, dioctyltin oxide, dibutyltin fatty acid salts, lead 2-ethylhexanoate, zinc octylate, zinc naphthenate, fatty acid zinc compounds, bismuth octanoate, bismuth 2-ethylhexanoate, bismuth oleate, bismuth neodecanoate, bismuth versatate, bismuth naphthenate, cobalt naphthenate, calcium octylate, copper naphthenate and tetra(2-ethylhexyl) titanate; and tertiary amines. These may be used alone or in combinations of two or more.

When the coating composition of the invention contains a curing catalyst, the curing catalyst content is preferably in the range of 0.05 to 10 parts by mass, more preferably in the range of 0.1 to 5 parts by mass and even more preferably in the range of 0.2 to 3 parts by mass, based on 100 parts by mass as the solid content of the coating composition.

Examples of color pigments include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like.

Brightness pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica.

Examples of extender pigments include talc, clay, kaolin, barium sulfate, barium carbonate, calcium carbonate and alumina white.

These pigments may be used alone or in combinations of two or more.

When the coating composition of the invention is to be used as a clear coating material and it contains a pigment, the pigment content is preferably an amount that does not interfere with the transparency of the obtained coating film, and it is usually preferred to be in the range of 0.1 to 20 parts by mass, more preferably in the range of 0.3 to 10 parts by mass and even more preferably in the range of 0.5 to 5 parts by mass, for example, based on 100 parts by mass of the solid content in the coating composition.

When the coating composition of the invention is to be used as a pigmented coating material and it contains a pigment, the pigment content is usually preferred to be in the range of 1 to 200 parts by mass, more preferably in the range of 2 to 100 parts by mass and even more preferably in the range of 5 to 50 parts by mass, for example, based on 100 parts by mass of the solid resin content in the coating composition.

Conventionally known ultraviolet absorbers may also be used, and examples include ultraviolet absorbers such as benzotriazole-based absorbers, triazine-based absorbers, salicylic acid derivative-based absorbers and benzophenone-based absorbers. Any of these may be used alone or in combinations of two or more.

When the coating composition of the invention contains an ultraviolet absorber, the ultraviolet absorber content is preferably in the range of 0.1 to 10 parts by mass, more preferably in the range of 0.2 to 5 parts by mass and even more preferably in the range of 0.3 to 2 parts by mass, based on 100 parts by mass as the solid content of the coating composition.

Conventionally known light stabilizers may be used, of which examples include hindered amine-based light stabilizers.

When the coating composition of the invention contains a light stabilizer, the light stabilizer content is preferably in the range of 0.1 to 10 parts by mass, more preferably in the range of 0.2 to 5 parts by mass and even more preferably in the range of 0.3 to 2 parts by mass, based on 100 parts by mass as the solid content of the coating composition.

From the viewpoint of storage stability, the coating composition of the invention that is used is preferably a two-component coating material separately containing the base component that includes the hydroxyl group-containing acrylic resin (A) and the matting agent (C), and the curing agent that includes the polyisocyanate compound (B), and more preferably it is used by mixing both just prior to use.

The organic solvent (D1) and organic solvent (D2) may be contained in the base component and/or curing agent, or they may be mixed with the base component and curing agent just prior to use, as dilution thinners. The organic solvents (D1) and (D2) are most preferably included in both the base component and curing agent.

Coating Method

There are no particular restrictions on the article to be coated, onto which the coating composition of the invention is applied, and for example, it may be a metal base material, for example, a steel sheet such as a cold-rolled steel sheet, galvanized steel sheet, zinc alloy-plated steel sheet, stainless steel sheet or tin-plated steel sheet, or an aluminum sheet or aluminum alloy sheet; or a plastic base material such as polyolefin, polycarbonate, ABS resin, urethane resin or polyamide. It may also be a vehicle body, of any of various types of vehicles such as automobiles, two-wheel vehicles or containers, formed of such base materials, or any of their parts.

The article to be coated may also be a metal base material or metal surface of a car body, that has been surface-treated by phosphate treatment, chromate treatment or complex oxide treatment. The article to be coated may be one having an undercoat film such as an electrodeposition coating formed, or having an undercoat film and intercoating film formed, or having an undercoat film, an intercoating film and a base coating film formed, or having an undercoat film, intercoating film, base coating film and clear coating film formed, on any of the metal base materials or car bodies mentioned above.

When the article to be coated is a plastic base material, the plastic base material may be degreased and/or surface-treated as necessary and appropriate. The article to be coated may be one having an undercoat film such as a primer coating material formed on the plastic base material surface, or one having an undercoat film and base coating film formed, or one having an undercoat film, base coating film and clear coating film formed.

The method of applying the coating composition of the invention is not particularly restricted, and for example, there may be mentioned air spray coating, airless spray coating, rotary atomizing coating, curtain coating or the like, which methods allow formation of wet coating films. An electrostatic charge may also be applied if necessary in these coating methods. Air spray coating and rotary atomizing coating are especially preferred among these. The coating amount of the coating composition of the invention is usually preferred to be an amount for a cured film thickness of about 10 to 50 μm.

When carrying out air spray coating, airless spray coating or rotary atomizing coating, the viscosity of the coating composition of the invention is preferably adjusted as appropriate using a solvent to within a suitable viscosity range for coating, and usually to a viscosity range of about 15-60 seconds at 20° C. as measured with a No. 4 Ford cup viscometer.

The wet coating film obtained by applying the coating composition of the invention onto the article to be coated is hardened by heating, which may be accomplished using known heating means with, for example, a drying furnace such as an air heating furnace, electric furnace, infrared induction heating furnace or the like. The heating temperature is not particularly restricted, but it is preferably in the range of 60 to 200° C. and more preferably 90 to 150° C., for example. The heating time is also not particularly restricted, but is preferably in the range of 10 to 60 minutes and more preferably 15 to 30 minutes, for example.

The coating composition of the invention may be suitably used as an top coating top clear coating material, because of its excellent gloss stability and anti-sagging properties. The present coating material is particularly suitable as a coating material for an automobile.

Multilayer Coating Film-Forming Method

The method for forming a multilayer coating film, by which the present coating material is applied as an top coating top clear coating material, may be a multilayer coating film-forming method in which at least one colored base coating material and at least one clear coating material are applied in that order on the article to be coated, wherein the coating composition of the invention is applied as the uppermost clear coating material. For example, the method used for forming a multilayer coating film may be the following Method I or Method II.

Method I

A method for forming a multilayer coating film comprising:
(1) a step of applying a base coat material composition (BC) onto an article to be coated to form an uncured base coat coating film,
(2) a step of applying a clear coating material composition (CC) onto the uncured base coat coating film to form an uncured clear coating film, and
(3) a step of heating the uncured base coat coating film and uncured clear coating film to simultaneously cure both coating films,
wherein the clear coating material composition (CC) is a coating composition of the invention.

Method II

A method for forming a multilayer coating film comprising:
(1) a step of applying a base coat material composition (BC) onto an article to be coated to form an uncured base coat coating film,
(2) a step of applying a first clear coating material composition (CC1) onto the uncured base coat coating film to form an uncured first clear coating film,
(3) a step of heating the uncured base coat coating film and uncured first clear coating film to simultaneously cure both coating films,
(4) a step of applying a second clear coating material composition (CC2) onto the cured first clear coating film to form an uncured second clear coating film, and (5) a step of heating the uncured second clear coating to cure it, wherein the second clear coating material composition (CC2) is a coating composition of the invention.

In Methods I and II, the article to be coated may be an article having a cured undercoat film formed by electrodeposition coating on a metal base material; an article having a cured intercoating film formed on the cured undercoat film; an article having an uncured intercoating film formed on the cured undercoat film; an article having a cured undercoat film formed by a polyolefin resin-containing primer coating material on a plastic base material; or an article having an uncured undercoat film formed by a polyolefin resin-containing primer coating material on a plastic base material.

In Methods I and II, the base coat material composition (BC) may be two or more base coat layers formed using two or more coating compositions. In order to promote volatilization of the solvent in the base coat material after application of the base coat material composition (BC) without causing curing the coating film, it may be preheated at 40 to 90° C. for about 3 to 30 minutes, for example.

Base Coat Material Composition (BC)

Examples that may be used for the base coat material composition (BC) include aqueous coating materials and organic solvent-based coating materials. Aqueous coating materials are preferred from the viewpoint of reducing environmental load.

For the present purpose, "aqueous coating material" generally refers to a coating material having a coating film-forming resin or pigment dispersed and/or dissolved in water or a medium composed mainly of water (an aqueous medium).

When the article to be coated is an automobile body, for example, the base coat material composition (BC) may be one that is known and is commonly used for coating of automobile bodies.

Specifically, the base coat material composition (BC) used may be one obtained by dissolving or dispersing a base resin such as an acrylic resin, polyester resin, alkyd resin, urethane resin or epoxy resin having a crosslinkable functional group such as a carboxyl or hydroxyl group, and a crosslinking agent such as an amino resin such as a melamine resin or urea resin or an optionally blocked polyisocyanate compound, together with a pigment, thickening agent and other optionally selected components, in water or an organic solvent, and preparing the solution or dispersion into a coatable form. It is preferred to use a thermosetting aqueous coating material using one or more selected from the group consisting of hydroxyl group-containing polyester resins and hydroxyl group-containing acrylic resins as the base resin, and using one or more selected from the group consisting of melamine resins and optionally blocked polyisocyanate compounds as the curing agent.

Examples of pigments include color pigments, extender pigments and brightness pigments, any of which may be used alone or in combinations of two or more.

Examples of color pigments include titanium oxide, zinc oxide, carbon black (including conductive carbon black), molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments and diketopyrrolopyrrole-based pigments.

Examples of extender pigments include talc, clay, kaolin, baryta, barium sulfate, barium carbonate, calcium carbonate, silica and alumina white.

Examples of brightness pigments include non-leafing or leafing aluminum (including vapor deposited aluminum), copper, zinc, brass, nickel, glass flakes, graphite flakes, aluminum oxide, mica, aluminum oxide covered by titanium oxide or iron oxide and mica covered by titanium oxide or iron oxide. Of these it is preferred to use one or more brightness pigments selected from among aluminum, mica, titanium oxide- or iron oxide-covered aluminum oxide, and titanium oxide- or iron oxide-covered mica. They may be used alone, or two or more may be used in combination.

The solid content of the base coat material composition (BC) may usually be 60 mass % or lower, and the solid content during application may usually be 10 to 50 mass %.

Additives that may be added to the base coat material composition (BC) include common coating material additives such as ultraviolet absorbers, light stabilizers, antioxidants, surface conditioners and antifoaming agents, including those mentioned above for the coating composition of the invention.

Clear Coating Material Composition (CC1)

When the article to be coated is an automobile body, for example, the clear coating material composition (CC1) may be one that is known and is commonly used for coating of automobile bodies.

Specifically, the clear coating material composition (CC1) used may be one obtained by dissolving or dispersing a base resin such as an acrylic resin, polyester resin or urethane resin having a crosslinkable functional group such as a carboxyl or hydroxyl group, and a crosslinking agent such as an amino resin such as a melamine resin or urea resin or an optionally blocked polyisocyanate compound, together with other optionally selected components, in an organic solvent, and preparing the solution or dispersion into a coatable form. It is preferred to use a thermosetting solvent coating material using one or more selected from the group consisting of hydroxyl group-containing polyester resins and hydroxyl group-containing acrylic resins as the base resin, and using one or more selected from the group consisting of melamine resins and optionally blocked polyisocyanate compounds as the curing agent.

The solid content of the clear coating material composition (CC1) may usually be 60 mass % or lower, and the solid content during application may usually be 30 to 50 mass %.

Optionally selected components that may be added to the clear coating material composition (CC1) include common coating material additives, including pigments such as color pigments, extender pigments and brightness pigments, including those mentioned above for the coating composition of the invention, as well as ultraviolet absorbers, light stabilizers, antioxidants, surface conditioners and antifoaming agents.

EXAMPLES

The present invention will now be explained in greater detail using production examples, examples and comparative examples. However, the invention is in no way limited by the examples. Throughout the examples, the "parts" and "%" values are based on mass, unless otherwise specified. Also, the film thicknesses of the coating films are based on the cured coating films. The addition amounts listed in the tables are represented as solid mass.

Production of Hydroxyl Group-Containing Acrylic Resin (A)

Production Example 1

After charging 31 parts of ethoxyethyl propionate into a four-necked flask equipped with a stirrer, thermometer, condenser tube and nitrogen gas inlet, the temperature was raised to 120° C. under nitrogen gas aeration. Upon reaching 120° C., the nitrogen gas aeration was halted and a monomer mixture having a composition comprising the monomers and polymerization initiators listed below was added dropwise over a period of 4 hours.

| | |
|---|---|
| Styrene | 15 parts, |
| Isobornyl acrylate | 30 parts, |
| 2-Ethylhexyl acrylate | 20 parts, |
| 2-Hydroxyethyl acrylate | 34 parts, |
| Acrylic acid | 1 part, |
| 2,2'-Azobisisobutyronitrile | 6 parts. |

After then ageing the mixture for 1 hour while aerating with nitrogen gas at 120° C., a mixture of 0.5 part of 2,2'-azobisisobutyronitrile and 5 parts of ethoxyethyl propionate was added dropwise over a period of 1 hour, and the mixture was further aged for 1 hour at about 120° C. and diluted with 27.5 parts of ethoxyethyl propionate to obtain a hydroxyl group-containing acrylic resin (A-1) solution with a solid content of 60%. The hydroxyl value of the obtained acrylic resin was 164 mgKOH/g based on solid content, the weight-average molecular weight was approximately 8,000 and the glass transition temperature was −6° C.

Properties of Matting Agent (C)
Evaluation Procedure

The mean particle size and oil absorption of commercially available matting agents (C-1) to (C-3) were evaluated in the following manner, with the results shown in Table 1.

Mean particle size: The D50 value was measured using a "Microtrac MT3300" laser diffraction/scattering particle size distribution analyzer (trade name of Nikkiso Co., Ltd.). For pretreatment, a mixed solvent comprising acetone and isopropyl alcohol was added to the silica particles and they were dispersed with ultrasonic waves for 1 minute, and then the matting agent concentration was adjusted to the prescribed transmittance range set by the device used.

Oil absorption: Measured according to JIS K5101-13-2: 2004.

TABLE 1

| Matting agent (C) name | C-1 | C-2 | C-3 |
|---|---|---|---|
| Commercial product name | SYLYSIA 436 | ACEMATT OK-412 | SYLYSIA 430 |
| Mean particle size [μm] | 4 | 6 | 4 |
| Oil absorption [mL/100 g] | 180 | 260 | 230 |
| Surface treatment | Organic treatment | Organic treatment | No treatment |

Production of Coating Composition

Example 1

After stirring and mixing 117 parts (70 parts solid content) of the hydroxyl group-containing resin (A-1) obtained in Production Example 1, 30 parts (30 parts solid content) of the following polyisocyanate compound (B-1), 15 parts (15 parts solid content) of the matting agent (C-1), 22 parts of the organic solvent (D1-1) and 55 parts of the organic solvent (D2-1) using a rotary stirrer, and further adding "SWASOL 1000" (product of Cosmo Oil Co., Ltd., boiling point: 150° C.-185° C., solubility parameter: 9.0), it was adjusted to a viscosity of 20 seconds with a No. 4 Ford cup at 20° C., to obtain a coating composition (1).

Examples 2 to 9 and Comparative Examples 1 to 4

For Example 1, coating compositions (2) to (13) each having a viscosity of 20 seconds with a No. 4 Ford cup at 20° C. were obtained in the same manner as Example 1, except that the composition was as listed in Table 2-1 to Table 2-3.

TABLE 2-1

| | | Examples | | | | |
|---|---|---|---|---|---|---|
| | | 1 | 2 | 3 | 4 | 5 |
| Coating composition name | | (1) | (2) | (3) | (4) | (5) |
| Hydroxyl-containing acrylic resin(A) | Type | A-1 | A-1 | A-1 | A-1 | A-1 |
| | Amount | 70 | 70 | 70 | 70 | 70 |
| Polyisocyanate compound (B) | Type | B-1 | B-1 | B-1 | B-1 | B-1 |
| | Amount | 30 | 30 | 30 | 30 | 30 |
| Matting agent (C) | Type | C-1 | C-2 | C-2 | C-2 | C-2 |
| | Amount | 15 | 15 | 15 | 15 | 15 |
| Organic solvent (D1) | Type | D1-1 | D1-1 | D1-1 | D1-1 | D1-2 |
| | Amount | 22 | 7 | 22 | 37 | 22 |
| Organic solvent (D2) | Type | D2-1 | D2-1 | D2-1 | D2-1 | D2-1 |
| | Amount | 55 | 70 | 55 | 40 | 55 |

TABLE 2-2

| | | Examples | | | |
|---|---|---|---|---|---|
| | | 6 | 7 | 8 | 9 |
| Coating composition name | | (6) | (7) | (8) | (9) |
| Hydroxyl-containing acrylic resin(A) | Type | A-1 | A-1 | A-1 | A-1 |
| | Amount | 70 | 70 | 70 | 70 |
| Polyisocyanate compound (B) | Type | B-1 | B-1 | B-1 | B-1 |
| | Amount | 30 | 30 | 30 | 30 |
| Matting agent (C) | Type | C-2 | C-2 | C-2 | C-3 |
| | Amount | 15 | 7 | 23 | 15 |
| Organic solvent (D1) | Type | D1-1 | D1-1 | D1-1 | D1-1 |
| | Amount | 22 | 22 | 22 | 22 |
| Organic solvent (D2) | Type | D2-2 | D2-1 | D2-1 | D2-1 |
| | Amount | 55 | 55 | 55 | 55 |

TABLE 2-3

|  |  | Comparative Example | | | |
|---|---|---|---|---|---|
|  |  | 1 | 2 | 3 | 4 |
| Coating composition name | | (10) | (11) | (12) | (13) |
| Hydroxyl-containing acrylic resin(A) | Type | A-1 | A-1 | A-1 | A-1 |
| | Amount | 70 | 70 | 70 | 70 |
| Polyisocyanate compound (B) | Type | B-1 | B-1 | B-1 | B-1 |
| | Amount | 30 | 30 | 30 | 30 |
| Matting agent (C) | Type | C-2 | C-2 | C-2 | C-2 |
| | Amount | 15 | 15 | 15 | 15 |
| Organic solvent (D1) | Type | D1-1 | D1-1 | D1-1 | D1-1 |
| | Amount | 2 | 50 | 37 | 7 |
| Organic solvent (D2) | Type | D2-1 | D2-1 | D2-1 | D2-1 |
| | Amount | 70 | 40 | 30 | 85 |

In Table 2-1 to Table 2-3, the contents of the hydroxyl group-containing acrylic resin (A), polyisocyanate compound (B) and matting agent (C) are solid contents, with (B-1), (C-1), (C-2), (C-3), (D1-1), (D1-2), (D2-1) and (D2-2) being as follows.

(B-1) "SUMIDUR N3300": trade name of Sumitomo Bayer Urethane Co., Ltd., isocyanurate of hexamethylene diisocyanate, solid content: 100%, isocyanate group content: 21.8%.
(C-1) "SYLYSIA 436": trade name of Fuji Silysia Chemical, Ltd., silica particles surface-treated with organic compound.
(C-2) "ACEMATT OK-412": trade name of Evonik Industries, silica particles surface-treated with organic compound.
(C-3) "SYLYSIA 430": trade name of Fuji Silysia Chemical, Ltd., untreated silica.
(D1-1) "DBE": trade name of Dow DuPont, mixed solvent of dimethyl glutarate, dimethyl succinate and dimethyl adipate, boiling point: 196 to 225° C., solubility parameter: 9.8.
(D1-2) Dipropylene glycol n-butyl ether: boiling point: 229° C., solubility parameter: 9.4.
(D2-1) Butyl acetate: boiling point: 126° C., solubility parameter: 8.7.
(D2-2) "Mixed xylene": trade name of Maruzen Petrochemical Co., Ltd., boiling point: 136° C., solubility parameter: 8.9.

Fabrication of Test Sheets

Example 10

Fabrication of test sheets for gloss stability evaluation and alkali resistance evaluation Three dull steel sheets with sizes of 30 cm×45 cm and thicknesses of 0.8 mm, subjected to chemical conversion treatment with zinc phosphate, were electrodeposited with "ELECRON GT-10" (trade name of Kansai Paint Co., Ltd., thermosetting epoxy resin-type cation electrodeposition coating material) to a cured film thickness of 20 μm and heated at 170° C. for 30 minutes for curing. These were air spray coated with "TP-65-2" (trade name of Kansai Paint Co., Ltd., polyester/melamine resin-based automobile intercoating material) to a cured film thickness of 35 μm, and heat cured at 140° C. for 30 minutes. Next, under coating booth conditions with a temperature of 23° C. and a relative humidity of 68% (booth conditions 1), the aqueous base coating material composition "WBC-713T No. 202" (trade name of Kansai Paint Co., Ltd., acrylmelamine resin-based aqueous top coating base coat material for automobiles, black) was applied onto the coated film to a film thickness of 15 μm, and after allowing it to stand for 5 minutes at room temperature, preheating was carried out for 3 minutes at 80° C. The coating composition (1) obtained in Example 1 was then coated onto the uncured base coating film, to a cured film thickness of 25 μm, 35 μm or 45 μm on different steel sheets, and allowed to stand for 10 minutes at room temperature, after which it was heated at 140° C. for 20 minutes for curing to fabricate test sheets 1 to 3. Test sheet 1 is the test sheet with a film thickness of 25 μm, test sheet 2 is the test sheet with a film thickness of 35 μm, and test sheet 3 is the test sheet with a film thickness of 45 μm, using coating composition (1).

Test sheet 4 was fabricated in the same manner as test sheet 2, except that the coating booth conditions 1 were changed to coating booth conditions with a temperature of 27° C. and a relative humidity of 77% (booth conditions 2).

Test sheet 5 was fabricated in the same manner as test sheet 2, except that the coating booth conditions 1 were changed to coating booth conditions with a temperature of 19° C. and a relative humidity of 51% (booth conditions 3).

Fabrication of Test Sheets for Anti-Sagging Properties Evaluation

A dull steel sheet with a size of 11 cm×45 cm and a thickness of 0.8 mm, subjected to chemical conversion treatment with zinc phosphate, was electrodeposited with "ELECRON GT-10" (trade name of Kansai Paint Co., Ltd., thermosetting epoxy resin-type cation electrodeposition coating material) to a cured film thickness of 20 μm and heated at 170° C. for 30 minutes for curing. This was air spray coated with "TP-65-2" (trade name of Kansai Paint Co., Ltd., polyester/melamine resin-based automobile intercoating material) to a cured film thickness of 35 μm, and heat cured at 140° C. for 30 minutes, to obtain a test coated article. Punch holes with 5 mm diameters were formed in rows of 21 each at 2 cm spacings, in sections 3 cm from the edges on the lengthwise sides of the test coated article. Next, under coating booth conditions with a temperature of 19° C. and a relative humidity of 51% (booth conditions 3), the aqueous base coating material composition "WBC-713T No. 202" (trade name of Kansai Paint Co., Ltd., acrylmelamine resin-based aqueous top coating base coat material for automobiles, black) was applied onto the test coated article to a film thickness of 15 μm, and it was allowed to stand for 5 minutes at room temperature. After then preheating for 3 minutes at 80° C., the uncured coating film was coated with the coating composition (1) obtained in Example 1 with a film thickness gradient of approximately 30 μm to 60 μm along the lengthwise direction, and it was allowed to stand for 10 minutes at room temperature. After heating for 20 minutes at 140° C., both coating films were cured together to obtain test sheet 6 for anti-sagging properties evaluation.

Examples 11 to 18, Comparative Examples 5 to 8

Test sheets 1 to 6 were obtained for each of Examples 11 to 18 and Comparative Examples 5 to 8 in the same manner as Example 10, except for using the coating compositions listed in Table 3-1 to Table 3-3 instead of coating composition (1) in Example 10.

Example 19

Fabrication of Test Sheets for Gloss Stability Evaluation and Alkali Resistance Evaluation Three dull steel sheets with sizes of 30 cm×45 cm and thicknesses of 0.8 mm, subjected to chemical conversion treatment with zinc phosphate, were electrodeposited with "ELECRON GT-10" (trade name of Kansai Paint Co., Ltd., thermosetting epoxy resin-type cation electrodeposition coating material) to a cured film thickness of 20 μm and heated at 170° C. for 30 minutes for curing. These were air spray coated with "TP-65-2" (trade name of Kansai Paint Co., Ltd., polyester/melamine resin-based automobile intercoating material) to a cured film thickness of 35 μm, and heat cured at 140° C. for 30 minutes. The aqueous base coating material composition "WBC-713T No. 202" (trade name of Kansai Paint Co., Ltd., acrylmelamine resin-based aqueous top coating base coat material for automobiles, black) was applied onto the coated film to a film thickness of 15 μm, and after allowing it to stand for 5 minutes at room temperature, preheating was carried out for 3 minutes at 80° C. The uncured coating film was then coated with "MAGICRON TC-69 CLEAR" (trade name of Kansai Paint Co., Ltd., acrylmelamine resin-based solvent-type top coating clear coating material for automobiles) to a film thickness of 35 μm, and after allowing it to stand for 10 minutes at room temperature, it was heated at 140° C. for 20 minutes and both coating films were cured together. Next, under coating booth conditions with a temperature of 23° C. and a relative humidity of 68% (booth conditions 1), the coating composition (3) obtained in Example 3 was coated onto the coated film, to a cured film thickness of 25 μm, 35 μm or 45 μm on different steel sheets, and allowed to stand for 10 minutes at room temperature, after which it was heated at 140° C. for 20 minutes for curing to obtain test sheets 1 to 3. Test sheet 1 is the test sheet with a film thickness of 25 μm, test sheet 2 is the test sheet with a film thickness of 35 μm, and test sheet 3 is the test sheet with a film thickness of 45 μm, using coating composition (3).

Test sheet 4 was obtained in the same manner as test sheet 2, except that the coating booth conditions 1 were changed to coating booth conditions with a temperature of 27° C. and a relative humidity of 77% (booth conditions 2).

Test sheet 5 was obtained in the same manner as test sheet 2, except that the coating booth conditions 1 were changed to coating booth conditions with a temperature of 19° C. and a relative humidity of 51% (booth conditions 3).

Fabrication of Test Sheets for Anti-Sagging Properties Evaluation

One dull steel sheet with a size of 11 cm×45 cm and a thickness of 0.8 mm, subjected to chemical conversion treatment with zinc phosphate, was electrodeposited with "ELECRON GT-10" (trade name of Kansai Paint Co., Ltd., thermosetting epoxy resin-type cation electrodeposition coating material) to a cured film thickness of 20 μm and heated at 170° C. for 30 minutes for curing. This was air spray coated with "TP-65-2" (trade name of Kansai Paint Co., Ltd., polyester/melamine resin-based automobile intercoating material) to a cured film thickness of 35 μm, and heat cured at 140° C. for 30 minutes. The aqueous base coating material composition "WBC-713T No. 202" (trade name of Kansai Paint Co., Ltd., acrylmelamine resin-based aqueous top coating base coat material for automobiles, black) was applied onto the coated film to a film thickness of 15 μm, and after allowing it to stand for 5 minutes at room temperature, preheating was carried out for 3 minutes at 80° C. The uncured coating film was then coated with "MAGICRON TC-69 CLEAR" (trade name of Kansai Paint Co., Ltd., acrylmelamine resin-based solvent-type top coating clear coating material for automobiles) to a film thickness of 35 μm, and after allowing it to stand for 10 minutes at room temperature, it was heated at 140° C. for 20 minutes and both coating films were cured together to obtain a test coated article. Punch holes with 5 mm diameters were formed in rows of 21 each at 2 cm spacings, in sections 3 cm from the edges on the lengthwise sides of the test coated article. Next, under coating booth conditions with a temperature of 19° C. and a relative humidity of 51% (booth conditions 3), the coating composition (3) obtained in Example 3 was coated onto the test coated article with a film thickness gradient so as to obtain film thicknesses of approximately 30 μm to 60 μm in the lengthwise direction, and allowed to stand for 10 minutes at room temperature, after which it was heated at 140° C. for 20 minutes for curing of the coated film to obtain test sheet 6 for anti-sagging properties evaluation.

For Examples 10 to 19 and Comparative Examples 5 to 8, each of the test sheets 1 to 6 was used to evaluate the matte property, gloss stability (difference in gloss due to variation in film thickness), gloss stability (difference in gloss due to variation in coating booth conditions), gloss stability (overall evaluation), anti-sagging properties and alkali resistance, based on the following performance test methods. The evaluation results are shown in Table 3-1 to Table 3-3.

TABLE 3-1

| | | | | | Examples | | | | |
|---|---|---|---|---|---|---|---|---|---|
| | | | | | 10 | 11 | 12 | 13 | 14 |
| Coating composition name | | | | | (1) | (2) | (3) | (4) | (5) |
| Matte property | | | | | 39 | 30 | 25 | 18 | 20 |
| Gloss stability | With film thickness variation | Booth conditions 1 | 60° Gloss | Film thickness: 25 μm | 41 | 33 | 27 | 20 | 23 |
| | | | | Film thickness: 45 μm | 37 | 27 | 24 | 16 | 18 |
| | | Difference in gloss due to variation in film thickness | | | 4 | 6 | 3 | 4 | 5 |
| | | Gloss stability (difference in gloss due to variation in film thickness) | | | S | A | S | S | A |
| | With variation in booth conditions | Booth conditions 2 | 60° Gloss | Film thickness: 35 μm | 40 | 32 | 26 | 21 | 23 |
| | | Booth conditions 3 | | | 37 | 28 | 23 | 16 | 19 |
| | | Difference in gloss due to variation in coating booth conditions | | | 3 | 4 | 3 | 5 | 4 |
| | | Gloss stability (difference in gloss due to variation in coating booth conditions) | | | S | S | S | A | S |
| | Gloss stability (overall evaluation) | | | | S | A | S | A | A |

TABLE 3-1-continued

|  | Examples | | | | |
| --- | --- | --- | --- | --- | --- |
|  | 10 | 11 | 12 | 13 | 14 |
| Anti-sagging properties | S | S | S | A | S |
| Alkali resistance | S | S | S | S | S |

TABLE 3-2

|  |  |  |  |  | Examples | | | | |
| --- | --- | --- | --- | --- | --- | --- | --- | --- | --- |
|  |  |  |  |  | 15 | 16 | 17 | 18 | 19 |
| Coating composition name |  |  |  |  | (6) | (7) | (8) | (9) | (3) |
| Matte property |  |  |  |  | 29 | 51 | 2 | 41 | 26 |
| Gloss stability | With film thickness variation | Booth conditions 1 | 60° Gloss | Film thickness: 25 μm | 32 | 54 | 3 | 45 | 28 |
|  |  |  |  | Film thickness: 45 μm | 27 | 48 | 1 | 38 | 25 |
|  |  | Difference in gloss due to variation in film thickness |  |  | 5 | 6 | 2 | 7 | 3 |
|  |  | Gloss stability (difference in gloss due to variation in film thickness) |  |  | A | A | S | A | S |
|  | With variation in booth conditions | Booth conditions 2 Booth conditions 3 | 60° Gloss | Film thickness: 35 μm | 33 | 53 | 4 | 45 | 27 |
|  |  |  |  |  | 28 | 49 | 1 | 36 | 24 |
|  |  | Difference in gloss due to variation in coating booth conditions |  |  | 5 | 4 | 3 | 9 | 3 |
|  |  | Gloss stability (difference in gloss due to variation in coating booth conditions) |  |  | A | S | S | A | S |
|  | Gloss stability (overall evaluation) |  |  |  | A | A | S | A | S |
| Anti-sagging properties |  |  |  |  | S | S | S | S | S |
| Alkali resistance |  |  |  |  | S | S | A | A | S |

TABLE 3-3

|  |  |  |  |  | Comparative Example | | | |
| --- | --- | --- | --- | --- | --- | --- | --- | --- |
|  |  |  |  |  | 5 | 6 | 7 | 8 |
| Coating composition name |  |  |  |  | (10) | (11) | (12) | (13) |
| Matte property |  |  |  |  | 32 | 18 | 24 | 31 |
| Gloss stability | With film thickness variation | Booth conditions 1 | 60° Gloss | Film thickness: 25 μm | 35 | 21 | 25 | 34 |
|  |  |  |  | Film thickness: 45 μm | 24 | 16 | 22 | 20 |
|  |  | Difference in gloss due to variation in film thickness |  |  | 11 | 5 | 3 | 14 |
|  |  | Gloss stability (difference in gloss due to variation in film thickness) |  |  | B | A | S | B |
|  | With variation in booth conditions | Booth conditions 2 Booth conditions 3 | 60° Gloss | Film thickness: 35 μm | 37 | 22 | 26 | 34 |
|  |  |  |  |  | 26 | 15 | 20 | 25 |
|  |  | Difference in gloss due to variation in coating booth conditions |  |  | 11 | 7 | 6 | 9 |
|  |  | Gloss stability (difference in gloss due to variation in coating booth conditions) |  |  | B | A | A | A |
|  | Gloss stability (overall evaluation) |  |  |  | B | A | A | B |
| Anti-sagging properties |  |  |  |  | S | B | B | S |
| Alkali resistance |  |  |  |  | S | S | S | S |

Performance Test Methods

Matte Property:

Evaluation was based on the 60° specular gloss of the test sheet 2 after application to a film thickness of 35 μm under coating booth conditions 1. A score of <75 is acceptable.

Gloss Stability (Difference in Gloss Due to Variation in Film Thickness):

Evaluation was on the following scale for the difference in the 60° specular gloss between test sheet 1 after application to a film thickness of 25 μm under coating booth conditions 1 and test sheet 3 after application to a film thickness of 45 μm under coating booth conditions 1.

Scores of S and A are acceptable.
- S: Difference of <5,
- A: Difference of ≥5 and <10,
- B: Difference of ≥10.

Gloss Stability (Difference in Gloss Due to Variation in Coating Booth Conditions):

Evaluation was on the following scale for the difference in the 60° specular gloss between test sheet 4 after application to a film thickness of 35 μm under coating booth conditions 2 and test sheet 5 after application to a film thickness of 35 μm under coating booth conditions 3.

Scores of S and A are acceptable.
- S: Difference of <5,
- A: Difference of ≥5 and <10,
- B: Difference of ≥10.

Gloss Stability (Overall Evaluation):

Evaluation was on the following scale, based on the results for gloss stability (difference in gloss due to variation in film thickness) and gloss stability (difference in gloss due to variation in coating booth conditions). Scores of S and A are acceptable.

S: S for both gloss stability (difference in gloss due to variation in film thickness) and gloss stability (difference in gloss due to variation in coating booth conditions),
- A: At least one A and no B for gloss stability (difference in gloss due to variation in film thickness) and gloss stability (difference in gloss due to variation in coating booth conditions),
- B: At least one B for gloss stability (difference in gloss due to variation in film thickness) and gloss stability (difference in gloss due to variation in coating booth conditions).

Anti-Sagging Properties:

Evaluation was by examining the location where sagging of the coating film was observed in an amount of 3 mm from the lower edges of the punch holes of test sheet 6 for anti-sagging properties evaluation, and measuring the film thickness (sagging limit film thickness (μm)) at that location. A larger sagging limit film thickness indicates more satisfactory anti-sagging properties.

Score of S and A are acceptable.
- S: Sagging limit film thickness of 45 μm,
- A: Sagging limit film thickness of 35 μm and <45 μm,
- B: Sagging limit film thickness of <35 μm.

Alkali Resistance:

Evaluation was on the following scale, after dropping 0.5 mL of a 1% sodium hydroxide aqueous solution onto the coating film surface of test sheet 2 that had been coated to a film thickness of 35 μm under coating booth conditions 1, allowing it to stand for 24 hours in an atmosphere with a temperature of 20° C. and a relative humidity of 65%, and then wiping the coating surface with gauze and visually examining the outer appearance. Scores of S and A are acceptable.

- S: Absolutely no abnormalities on the coating film surface,
- A: Discoloration (whitening) of the coating film surface observed,
- B: Considerable discoloration (whitening) of the coating film surface observed.

The invention claimed is:

1. A clear coating material composition comprising a hydroxyl group-containing acrylic resin (A), a polyisocyanate compound (B), a matting agent (C), an organic solvent (D1) and an organic solvent (D2), which components (A), (B), (C), (D1) and (D2) form said clear coating material composition, wherein:
   the organic solvent (D1) is an organic solvent with a boiling point in a range of 190 to 250° C. and a solubility parameter of 9.3 to 10.5,
   the organic solvent (D2) is an organic solvent with a boiling point in a range of 100 to 140° C. and a solubility parameter of 8 or greater and less than 9, and
   a content of the organic solvent (D1) is in a range of 5 to 40 parts by mass and a content of the organic solvent (D2) is in a range of 35 to 75 parts by mass, based on 100 parts by mass of a total solid content of the hydroxyl group-containing acrylic resin (A) and polyisocyanate compound (B).

2. The coating composition according to claim 1, wherein the matting agent (C) is silica particles (C1).

3. The coating composition according to claim 2, wherein the silica particles (C1) are organically treated silica particles (C1').

4. The coating composition according to claim 1, wherein a total content of the organic solvent (D1) and organic solvent (D2) is in a range of 60 to 100 parts by mass based on 100 parts by mass of the total solid content of the hydroxyl group-containing acrylic resin (A) and polyisocyanate compound (B).

5. A method for forming a multilayer coating film comprising:
   (1) a step of applying a base coat material composition (BC) onto an article to be coated to form an uncured base coat coating film,
   (2) a step of applying a clear coating material composition (CC) onto the uncured base coat coating film to form an uncured clear coating film, and
   (3) a step of heating the uncured base coat coating film and uncured clear coating film to simultaneously cure both coating films,
   wherein the clear coating material composition (CC) is a coating composition according to claim 1.

6. A method for forming a multilayer coating film comprising:
   (1) a step of applying a base coat material composition (BC) onto an article to be coated to form an uncured base coat coating film,
   (2) a step of applying a first clear coating material composition (CC1) onto the uncured base coat coating film to form an uncured first clear coating film,
   (3) a step of heating the uncured base coat coating film and uncured first clear coating film to simultaneously cure both coating films,
   (4) a step of applying a second clear coating material composition (CC2) onto the cured first clear coating film to form an uncured second clear coating film, and
   (5) a step of heating the uncured second clear coating film to cure it,
   wherein the second clear coating material composition (CC2) is a coating composition according to claim 1.

7. The coating composition according to claim 1, wherein the organic solvent (D1) is an organic solvent with a solubility parameter of 9.5 to 10.0.

8. The coating composition according to claim 1, wherein the organic solvent (D1) is an organic solvent with a solubility parameter of 9.4 to 9.8.

9. The coating composition according to claim 1, wherein the organic solvent (D2) is an organic solvent with a solubility parameter of 8.1 to 8.9.

10. The coating composition according to claim 1, wherein the organic solvent (D2) is an organic solvent with a solubility parameter of 8.3 to 8.8.

11. The coating composition according to claim 1, wherein the organic solvent (D2) is an organic solvent with a solubility parameter of 8.7 to 8.9.

12. The coating composition according to claim 1, wherein the organic solvent (D1) is an organic solvent with a solubility parameter of 9.4 to 9.8 and the organic solvent (D2) is an organic solvent with a solubility parameter of 8.7 to 8.9.

13. A multilayer coating film comprising a layer formed from the coating composition according to claim 1.

14. A cured layer of a coating film that has been formed from the coating composition according to claim 1.

15. An article comprising a multilayer coating film, which coating film comprises a layer formed from the coating composition according to claim 1.

16. The coating composition according to claim 1, wherein the organic solvent (D1) is an organic solvent with a solubility parameter of 9.6 to 10.0.

17. The coating composition according to claim 1, wherein the organic solvent (D1) is an organic solvent with a solubility parameter of 9.7 to 10.0.

18. The coating composition according to claim 1, wherein the organic solvent (D1) is an organic solvent with a solubility parameter of 9.8 to 10.0.

* * * * *